United States Patent
Okami et al.

(10) Patent No.: US 10,724,416 B2
(45) Date of Patent: Jul. 28, 2020

(54) EXHAUST HEAT RECOVERY DEVICE

(71) Applicant: FUTABA INDUSTRIAL CO., LTD., Okazaki-shi, Aichi (JP)

(72) Inventors: Hirohisa Okami, Okazaki (JP); Hiromi Ishikawa, Okazaki (JP); Naohiro Takemoto, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 0 days.

(21) Appl. No.: 15/532,227

(22) PCT Filed: Oct. 29, 2015

(86) PCT No.: PCT/JP2015/080565
§ 371 (c)(1),
(2) Date: Jun. 1, 2017

(87) PCT Pub. No.: WO2016/088489
PCT Pub. Date: Jun. 9, 2016

(65) Prior Publication Data
US 2017/0268401 A1     Sep. 21, 2017

(30) Foreign Application Priority Data

Dec. 3, 2014  (JP) .................................. 2014-244980

(51) Int. Cl.
*F01N 5/02*       (2006.01)
*F02G 5/02*       (2006.01)
(Continued)

(52) U.S. Cl.
CPC .............. *F01N 5/02* (2013.01); *F01N 13/08* (2013.01); *F02G 5/02* (2013.01); *F28D 9/0012* (2013.01);
(Continued)

(58) Field of Classification Search
USPC .... 60/275, 292, 298, 320, 321, 324; 165/51, 165/52
See application file for complete search history.

(56) References Cited

U.S. PATENT DOCUMENTS 6,702,190 B1 * 3/2004 Nohl ...................... B60H 1/025
165/41
9,074,506 B2 * 7/2015 An ........................... F01N 5/025
(Continued)

FOREIGN PATENT DOCUMENTS

JP     S62-112473 U      7/1987
JP     2007315370    * 12/2007
(Continued)

OTHER PUBLICATIONS

Notification of Transmittal of Translation of the International Preliminary Report on Patentability (Form PCT/IB/338) for International Application No. PCT/JP2015/080565, dated Jun. 15, 2017, 1 page.

(Continued)

*Primary Examiner* — Binh Q Tran
(74) *Attorney, Agent, or Firm* — Withrow & Terranova, P.L.L.C.; Vincent K. Gustafson

(57) ABSTRACT

An exhaust heat recovery device comprises an exhaust pipe, a shell member, a heat exchange portion, a guide portion, and a valve. An exhaust gas downstream end that is a downstream end along the flow path for exhaust gases in the exhaust pipe is disposed in the downstream side of a downstream-side end portion of the heat exchanger along the flow path for exhaust gases in the exhaust pipe. The guide portion comprises a partition wall portion that is a portion from the exhaust gas downstream end in the exhaust pipe to the downstream-side end portion of the heat exchanger in the exhaust pipe, and a guide member disposed so as to at least partially cover a radially outside of the (Continued)

partition wall portion in a manner so as to have an interspace between the partition wall portion and the guide member.

13 Claims, 3 Drawing Sheets

(51) Int. Cl.
    *F28D 9/00* (2006.01)
    *F01N 13/08* (2010.01)
    *F28D 21/00* (2006.01)
    *F28F 27/02* (2006.01)

(52) U.S. Cl.
    CPC ....... *F28D 9/0043* (2013.01); *F28D 21/0003* (2013.01); *F28F 27/02* (2013.01); *F01N 2240/02* (2013.01); *F28F 2250/06* (2013.01); *Y02T 10/16* (2013.01); *Y02T 10/166* (2013.01)

(56) References Cited

U.S. PATENT DOCUMENTS

| | | | |
|---|---|---|---|
| 9,702,292 B2* | 7/2017 | Kobayashi | F01N 5/02 |
| 2010/0146954 A1* | 6/2010 | Sloss | F01N 3/2889 |
| | | | 60/320 |
| 2012/0060484 A1* | 3/2012 | Eder | F01N 5/02 |
| | | | 60/320 |
| 2012/0144814 A1* | 6/2012 | Won | F01M 5/001 |
| | | | 60/320 |
| 2014/0352286 A1 | 12/2014 | Kato et al. | |
| 2015/0184571 A1 | 7/2015 | Kobayashi et al. | |
| 2015/0218997 A1* | 8/2015 | Kato | F01N 5/02 |
| | | | 165/103 |

FOREIGN PATENT DOCUMENTS

| | | |
|---|---|---|
| JP | 2007315370 A | 12/2007 |
| JP | 2009-144606 A | 7/2009 |
| JP | 2013-130159 A | 7/2013 |
| JP | 2014-034963 A | 2/2014 |
| WO | 2014014080 A1 | 1/2014 |

OTHER PUBLICATIONS

International Preliminary Report on Patentability (Chapter I of the Patent Cooperation Treaty) (Form PCT/IB/373 and Translation of Form PCT/ISA/237) for International Application No. PCT/JP2015/080565, dated Jun. 6, 2017, 5 pages.
International Search Report for International Patent Application No. PCT/JP2015/080565 (Form PCT/ISA/210), dated Dec. 8, 2015 (4 pages including English translation).
Written Opinion for International Patent Application No. PCT/JP2015/080565 (Form PCT/ISA/237), dated Dec. 8, 2015 (5 pages including English machine translation of Section V only).
Notification of Reasons for Refusal for Japanese Patent Application No. 2014-244980, dated Nov. 13, 2018, 4 pages.
Notification of the First Office Action for Chinese Patent Application No. 201580066009.5, dated Sep. 29, 2018, 14 pages.
Notice of Reasons for Refusal for Japanese Patent Application No. 2014-244980, dated Jun. 4, 2019, 4 pages including English translation.
Decision of Refusal for Japanese Patent Application No. 2014-244980, dated Jan. 7, 2020, 4 pages including English translation.

* cited by examiner

EXHAUST HEAT RECOVERY DEVICE

CROSS-REFERENCE TO RELATED APPLICATION

This application is a 35 U.S.C. § 371 national phase filing of International Application No. PCT/JP2015/080565 filed on Oct. 29, 2015, and claims the benefit of Japanese Patent Application No. 2014-244980 filed on Dec. 3, 2014 with the Japan Patent Office. The entire disclosures of International Application No. PCT/JP2015/080565 and Japanese Patent Application No. 2014-244980 are hereby incorporated by reference herein in their respective entireties.

TECHNICAL FIELD

The present disclosure is related to an exhaust heat recovery device.

BACKGROUND ART

An exhaust heat recovery device is known in which exhaust heat is recovered by performing heat exchange between exhaust gases from an internal combustion engine as a high-temperature fluid and cooling water of the internal combustion engine as a low-temperature fluid (see Patent Document 1).

The exhaust heat recovery device disclosed in Patent Document 1 comprises an exhaust pipe, a shell member, a heat exchange portion, an exhaust gas inflow portion, and a valve. The exhaust pipe is a member formed in a tubular shape and guides exhaust gases from the internal combustion engine to the downstream side. The shell member is a tubular member that covers the outside of the exhaust pipe. The heat exchange portion has a heat exchanger disposed between the exhaust pipe and the shell member. The heat exchanger performs heat exchange between exhaust gases as a high-temperature fluid and a low-temperature fluid flowing inside thereof.

The exhaust inflow portion in Patent Document 1 is a portion where exhaust gases flowing out of the exhaust pipe enters the heat exchange portion. The exhaust gas inflow portion in Patent Document 1 is an opening formed in the upstream side of the downstream-side end portion of the heat exchanger along the flow path for exhaust gases in the exhaust pipe and formed along the entire circumference of the exhaust pipe.

The valve is disposed in the downstream side of the exhaust gas inflow portion along the flow path for exhaust gases in the exhaust pipe.

Specifically, in the exhaust heat recovery device, the valve is closed to close the exhaust pipe when the temperature of the cooling water of the internal combustion engine is low. Accordingly, exhaust gases from the internal combustion engine enter the heat exchange portion from the exhaust gas inflow portion and heat exchange is performed in the heat exchange portion with the cooling water.

On the other hand, in the exhaust heat recovery device, the valve is opened to open the exhaust pipe when the temperature of the cooling water of the internal combustion engine is high. Accordingly, in the exhaust heat recovery device, the flow rate of exhaust gases entering the heat exchange portion from the exhaust inflow portion is decreased so as to reduce heat transfer from the exhaust heat to the cooling water.

PRIOR ART DOCUMENT

Patent Document

Patent Document 1: Japanese Unexamined Patent Application Publication No. 2014-34963

SUMMARY OF THE INVENTION

Problems to be Solved by the Invention

In the exhaust heat recovery device disclosed in Patent Document 1, the opening of the exhaust pipe forming the exhaust gas inflow portion is formed in the upstream side of the downstream-side end portion of the heat exchanger along the flow path for exhaust gases in the exhaust pipe.

Accordingly, in the exhaust heat recovery device disclosed in Patent Document 1, exhaust gases may enter the heat exchange portion from the exhaust pipe via the exhaust gas inflow portion even when the valve is open. As a result, in the exhaust heat recovery device disclosed in Patent Document 1, unnecessary heat transfer from exhaust gases to the cooling water may be caused while the valve is open.

In an exhaust heat recovery device, the flow rate of exhaust gases entering from the exhaust pipe to the heat exchange portion when the valve is open is required to be further reduced.

In one aspect of the present disclosure, it is desirable that, in an exhaust heat recovery device, the flow rate of exhaust gas entering the heat exchange portion is further reduced when the valve is open.

Means for Solving the Problems

One aspect of the present disclosure is related to an exhaust heat recovery device comprises an exhaust pipe, a shell member, a heat exchange portion, a guide portion, and a valve.

The exhaust pipe is a member formed in a tubular shape and guides exhaust gases from an internal combustion engine to a downstream side. The shell member is a tubular member that covers a radially outside of the exhaust pipe. The heat exchange portion comprises a heat exchanger disposed between the exhaust pipe and the shell member. The heat exchanger performs heat exchange between the exhaust gases as a high-temperature fluid and a low-temperature fluid flowing within the heat exchanger.

The guide portion forms a guide path that guides exhaust gases from the exhaust pipe to the heat exchange portion. The valve is disposed in a downstream side of the guide portion along a flow path for exhaust gases in the exhaust pipe and opens and closes the exhaust pipe.

In one aspect of the present disclosure, the exhaust gas downstream end is disposed in the downstream side of a downstream-side end portion of the heat exchanger along the flow path for exhaust gases in the exhaust pipe. The exhaust gas downstream end mentioned herein is an end located in the downstream side of the exhaust pipe along the fluid path for the exhaust gases in the exhaust pipe.

The guide portion of the exhaust heat recovery device according to one aspect of the present disclosure comprises a partition wall portion and a guide member. The partition wall portion is a portion from the exhaust gas downstream end in the exhaust pipe to a position of the downstream-side end portion of the heat exchanger on the exhaust pipe. The guide member is disposed so as to at least partially cover a radially outside of the partition wall portion in a manner so as to have an interspace between the partition wall portion in the exhaust pipe and the guide member.

That is, in the guide portion of the exhaust heat recovery device according to one aspect of the present disclosure, the interspace formed between the guide member and the partition wall portion serves as the guide path. The guide path is a fluid path for the exhaust gases that is led to a direction opposite to the direction of the flow path for exhaust gases in the exhaust pipe. Accordingly, the exhaust gases that flow the guide portion do not reach the heat exchange portion unless the direction of the flow of the exhaust gases is changed to a reverse direction opposite to the direction of the flow of exhaust gases in the exhaust pipe.

Thus, according to one aspect of the present disclosure, in the event the valve is opened so as to open the exhaust pipe and exhaust gases flow to the downstream of the exhaust pipe, the flow rate of exhaust gases flowing in the guide portion and consequently the flow rate of exhaust gases entering the heat exchange portion can be reduced. As a result, with the exhaust heat recovery device according to one aspect of the present disclosure, heat transfer to the low-temperature fluid when the valve is open can be reduced.

Moreover, the guide member of the exhaust heat recovery device according to one aspect of the present disclosure may comprise a guide downstream end being disposed radially away from an inner surface of the exhaust pipe at the exhaust gas downstream end. The guide downstream end mentioned here is an end portion in the downstream side of the guide member along the fluid path for exhaust gases in the exhaust pipe.

In the exhaust heat recovery device configured as described above, providing the guide portion can inhibit the exhaust pipe from being narrowed.

As a result, the exhaust heat recovery device according to one aspect of the present disclosure can inhibit loss of pressure around the guide portion in the exhaust pipe and make the flow of exhaust gases in the exhaust pipe smooth when the valve is open. Accordingly, the exhaust heat recovery device according to one aspect of the present disclosure can more reliably reduce the flow rate of exhaust gases that flow in the guide portion when the valve is open, and consequently the flow rate of exhaust gases that flow into the heat exchange portion.

Furthermore, in the heat exchanger according to one aspect of the present disclosure, at least one plate may be provided having an internal space in which the low-temperature fluid flows. The at least one plate may be disposed extending in a circumferential direction of the exhaust pipe. Moreover, the guide portion according to one aspect of the present disclosure may be a double-layered pipe having the partition wall portion serving as an inner tube and the guide member serving as an outer tube.

In the exhaust heat recovery device configured as described above, heat exchange between the exhaust gases and the low-temperature fluid can be achieved with the plate extending in the circumferential direction of the exhaust pipe.

Since this plate is disposed extending in the circumferential direction of the exhaust pipe, the exhaust heat recovery device according to one aspect of the present disclosure can reserve a large area of the plate for the direct contact by the highly-heated exhaust gases flowing from the guide portion into the heat exchange portion. Therefore, the exhaust heat recovery device according to one aspect of the present disclosure can effectively recover heat from the exhaust gases.

The guide member according to one aspect of the present disclosure may be a valve seat constituting the valve.

The exhaust heat recovery device configured as described above, the valve seat can be used as the guide member, and a member that specifically serves as the valve seat does not have to be provided. In other words, the exhaust heat recovery device according to one aspect of the present disclosure can inhibit an increase in the number of components.

EXPLANATION OF REFERENCE NUMERALS

1 . . . exhaust heat recovery device, 2 . . . exhaust gas discharging portion, 4 . . . shell member, 6 . . . heat exchange portion, 8 . . . guide portion, 10 . . . valve 12, 14 . . . exhaust pipe, 16 . . . upstream end, 18 . . . exhaust gas downstream end, 20 . . . outer shell member, 22 . . . lid member, 24 . . . holding member, 30 . . . heat exchanging chamber, 40 . . . heat exchanger, 42 . . . outflow path heat exchanging portion, 44 . . . inflow path heat exchanging portion, 46 . . . plate, 48 . . . the first member, 50 . . . second member, 70 . . . partition wall portion, 74 . . . downstream-side end portion, 80 . . . guide member, 82 . . . guiding portion, 84 . . . covering portion, 90 . . . end portion, 92 . . . guide downstream end, 102 . . . valve body, 104 . . . valve seat, 106 . . . valve stem, 108 . . . mesh member, 110 . . . internal combustion engine, 114 . . . coolant (low-temperature fluid), 112 . . . exhaust gases (high-temperature fluid)

Mode for Carrying Out the Invention

The following describes one example of an embodiment according to the present disclosure with reference to drawings attached hereto.

<Exhaust Heat Recovery Device>

Figure 1:
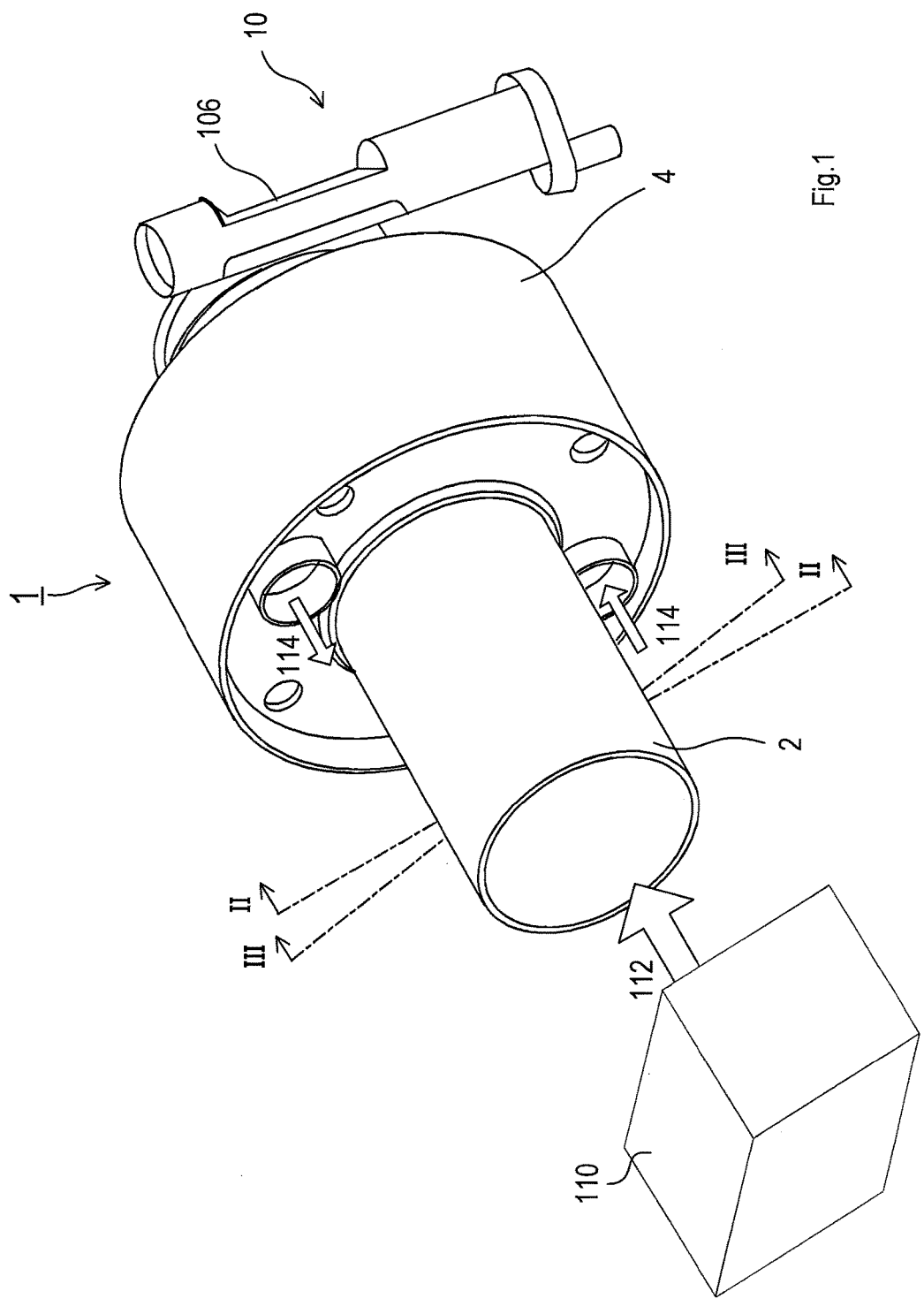
FIG. 1 is a perspective view showing a general external appearance of an exhaust heat recovery device according to one embodiment.

An exhaust heat recovery device 1 shown in FIG. 1 is installed in a moving object having an internal combustion engine 110. This exhaust heat recovery device 1 recovers heat from exhaust gases by performing heat exchange between exhaust gases 112 from the internal combustion engine 110 as a high-temperature fluid, and coolant 114 of the internal combustion engine 110 as a low-temperature fluid. The coolant 114 in the present embodiment may be cooling water or oil liquid.

The exhaust heat recovery device 1 in the present embodiment comprises an exhaust gas discharging portion 2, a shell member 4, a heat exchange portion 6 (see FIGS. 2, 3), a guide portion 8 (see FIGS. 2, 3), and a valve 10.

The exhaust gas discharging portion 2 forms a path that guides exhaust gases 112 from the internal combustion engine 110 to the downstream side. The shell member 4 is a member that covers the outside of the exhaust gas discharging portion 2.

The heat exchange portion 6 has a heat exchanger 40 (see FIGS. 2, 3) disposed between the exhaust gas discharging portion 2 and the shell member 4, and performs heat exchange between the exhaust gases 112 that is high-temperature fluid and low-temperature fluid that flows inside of the plate 46 of the heat exchanger 40.

The guide portion 8 is a portion that guides exhaust gases from the exhaust gas discharging portion 2 into the heat exchange portion 6. The valve 10 is a known valve that opens and closes the path and is disposed in the downstream side of the guide portion 8 along the flow path for the exhaust gases 112 in the exhaust gas discharging portion 2.

<Structure of Exhaust Heat Recovery Device>

Subsequently, the structure of the exhaust heat recovery device 1 will be described in detail.

Figure 2:
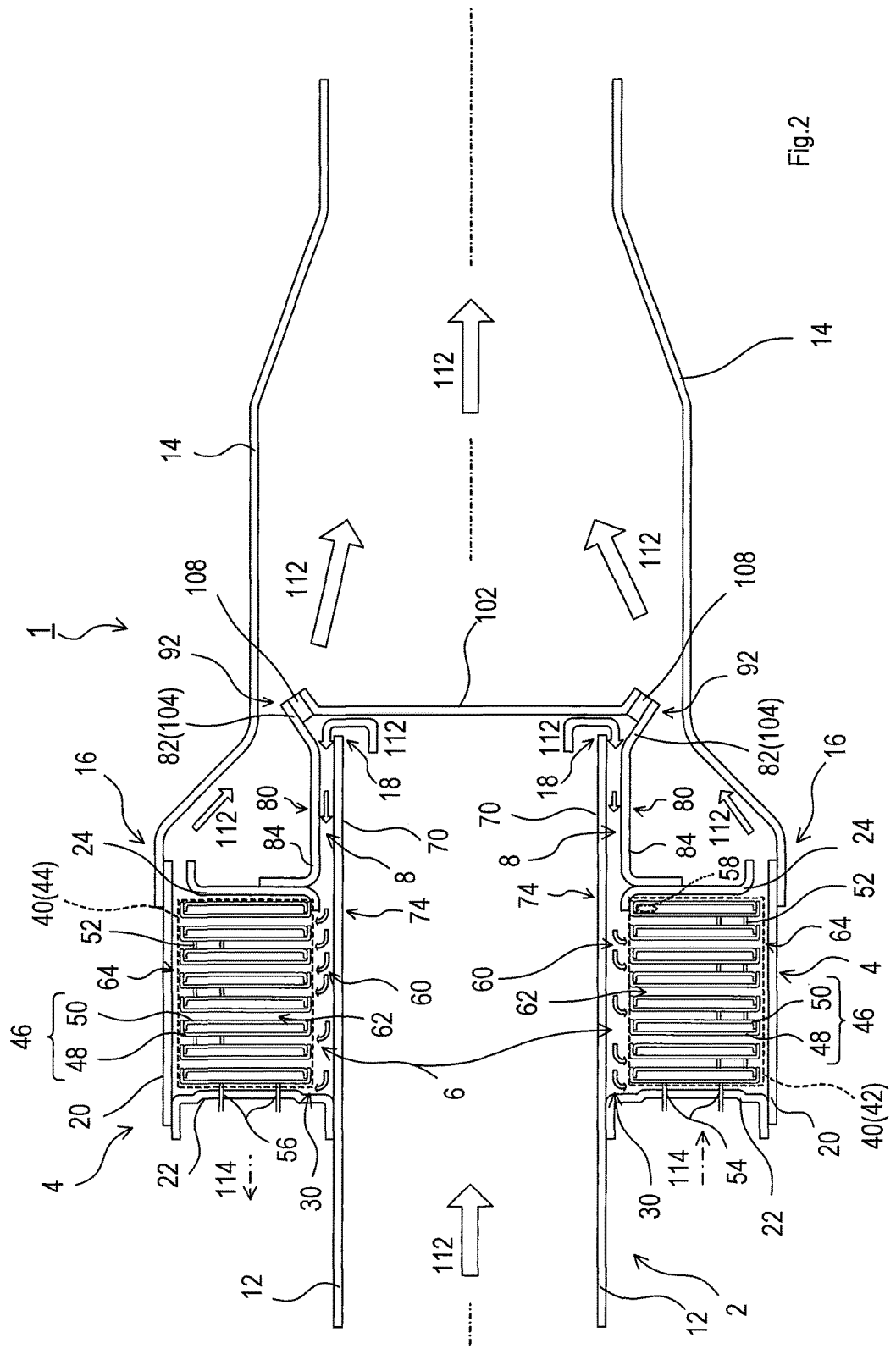
FIG. 2 is a sectional view showing the exhaust heat recovery device in a state in which a valve is closed, and being cut along with II-II in FIG. 1.
Figure 3:
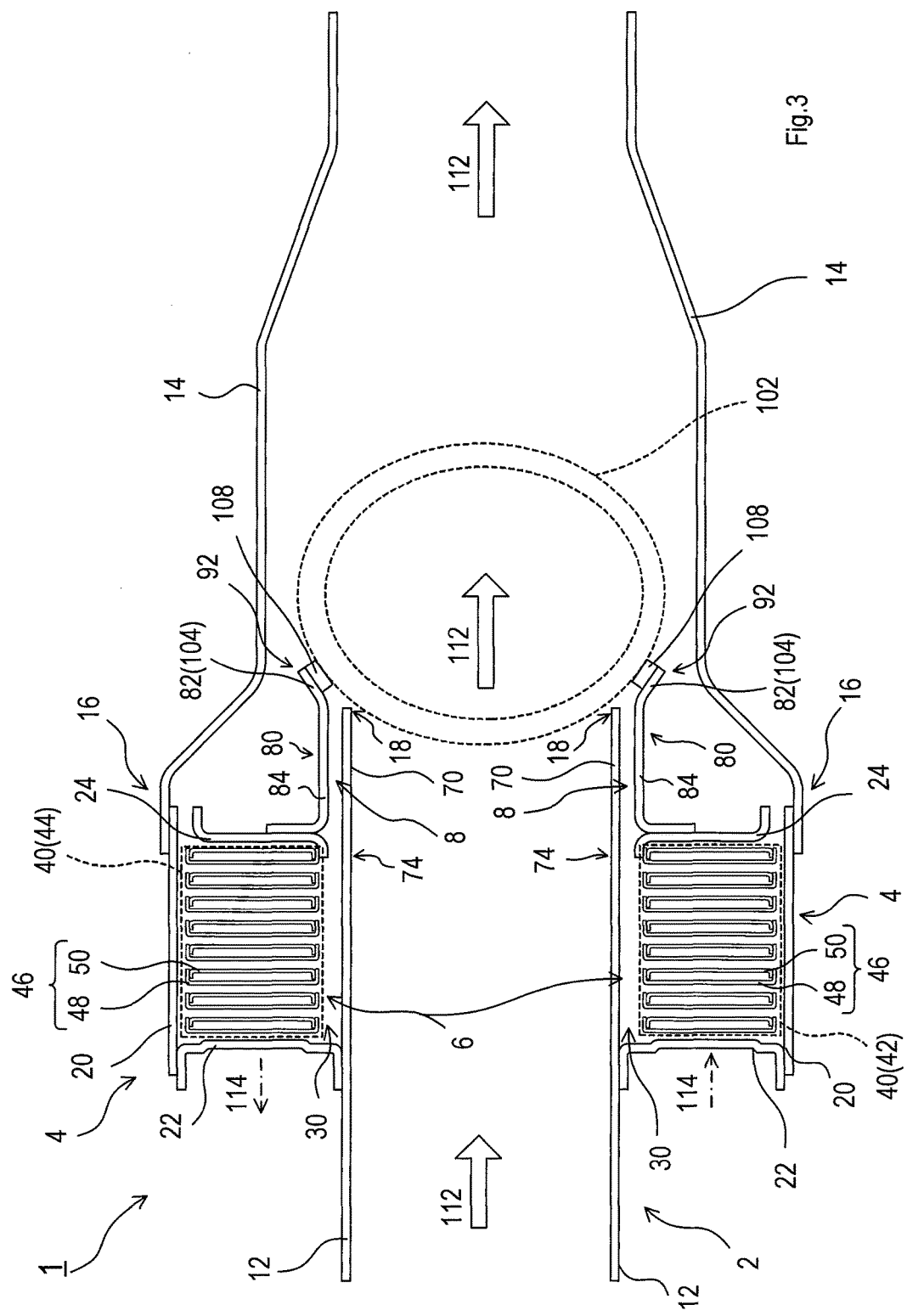
FIG. 3 is a sectional view showing the exhaust heat recovery device in a state in which a valve is open, and being cut along with III-III in FIG. 1.

As shown in FIG. 2 and FIG. 3, the exhaust gas discharging portion 2 comprises exhaust pipes 12, 14.

The exhaust pipe 12 is formed in a tubular shape and open at both ends thereof. The upstream-side end, which is one end of the exhaust pipe 12, is connected to a member that the exhaust gases 112 from the internal combustion engine 110 enter. The member that the exhaust gases 112 from the internal combustion engine 110 enter may be, for example, an exhaust pipe, an exhaust manifold, or the like.

The exhaust pipe 14 is formed in a tubular shape and open at both ends thereof. The upstream end 16, which is one end of the exhaust pipe 14, has an opening with an inner diameter larger than the outer diameter of the exhaust pipe 12.

In the internal space in the upstream end 16 of the exhaust pipe 14, an exhaust gas downstream end 18, which is an end of the exhaust pipe 12 in the opposite side of the upstream end, is disposed in a manner so as not to contact with the exhaust pipe 14.

The downstream end, which is an end of the exhaust pipe 14 in the opposite side of the upstream end 16, has an opening with a diameter smaller than the outer diameter of the upstream end 16.

The shell member 4 comprises an outer shell member 20, a lid member 22, and a holding member 24.

The outer shell member 20 is open at both ends and formed in a tubular shape with an inner diameter larger than the outer diameter of the exhaust pipe 12. The outer diameter of the outer shell member 20 is identical to the inner diameter of the upstream end 16 of the exhaust pipe 14.

The outer shell member 20 is disposed concentrically (coaxially) with the exhaust pipe 12. Moreover, the end portion in the downstream side of the outer shell member 20 is connected to the upstream end 16 of the exhaust pipe 14.

A lid member 22 is a member formed in a ring like shape.

The lid member 22 is connected to the periphery of the opening portion in the upstream side of the outer shell member 20 so as to close the opening in the upstream side of the outer shell member 20 located along the flow path for the exhaust gases 112 in the exhaust pipe 12.

In other words, an annular space surrounded by the outer shell member 20, the lid member 22, and the exhaust pipe 12 is formed with the outer shell member 20, the lid member 22, and the exhaust pipe 12. Hereinafter, the annular space surrounded by the outer shell member 20, the lid member 22, and the exhaust pipe 12 will be referred to as a heat exchanging chamber 30.

The heat exchanger 40 disposed in the heat exchanging chamber 30 is a heat exchanger in which the coolant 114 flows, and is disposed so as to cover the outer periphery of the exhaust pipe 12.

In the present embodiment, the heat exchanger 40 comprises an outflow path heat exchanging portion 42 and an inflow path heat exchanging portion 44. In the outflow path heat exchanging portion 42, the coolant 114 flows from the upstream to the downstream along the flow path for exhaust gases of the exhaust pipe 12. In the inflow path heat exchanging portion 44, the coolant 114 that has reached the downstream along the flow path for exhaust gases in the exhaust pipe 12 in the outflow path heat exchanging portion 42 flows from the downstream to the upstream along the flow path for exhaust gases of the exhaust pipe 12.

The outflow path heat exchanging portion 42 and the inflow path heat exchanging portion 44 are a heat exchanger having plates 46 with a flow space in which low-temperature fluid flows.

The plates 46 constituting the outflow path heat exchanging portion 42 and the inflow path heat exchanging portion 44 each comprise a first member 48 and a second member 50.

On the peripheries of the first members 48, wall portions projecting in the same direction are formed. On the periphery of the second members 50, wall portions projecting in the same direction are formed.

The plates 46 are formed by the inner surfaces of the wall portions of the first members 48 respectively being engaged with the outer surfaces of the wall portions of the second members 50. An interspace is formed for each plate 46 between the inner surface of the first member 48 and the inner surface of the second member 50. The interspace serves as the flow space in which the low-temperature fluid flows, that is, a flow path for the coolant 114.

Moreover, among the plates 46 constituting the outflow path heat exchanging portion 42, the plate 46 disposed in the end portion in the upstream side along the flow path for the coolant 114 is connected to an inflow pipe 54 through which the coolant 114 enters the outflow path heat exchanging portion 42. Furthermore, among the plates 46 constituting the outflow path heat exchanging portion 42, the plate 46 disposed in the end portion in the downstream side along the flow path for the coolant 114 is connected to a pipe 58 through which the coolant 114 enters the inflow path heat exchanging portion 44.

Furthermore, among the plates 46 constituting the inflow path heat exchanging portion 44, the plate 46 disposed in the end portion in the downstream side along the flow path for the coolant 114 is connected to an outflow pipe 56 through which the coolant 114 flows out of the inflow path heat exchanging portion 44.

In the present embodiment, each of the plates 46 is disposed along the axial direction of the exhaust pipe 12 so as to cover the outer surface of the exhaust pipe 12. The plates 46 disposed along the axial direction of the exhaust pipe 12 are each stacked such that an interspace 62 is formed between the outer surfaces of the plates 46 disposed adjacent to each other along the axial direction of the exhaust pipe 12. Two adjacent plates 46 disposed along the axial direction of the exhaust pipe 12 are connected by a communication member 52 formed in a tubular shape such that the coolant 114 flows between the adjacent plates 46.

The plates 46 constituting the heat exchanger 40 are each disposed such that an interspace 60 is formed between the radially inner periphery of the exhaust pipe 12 and the outer surface of the exhaust pipe 12. Furthermore, the plates 46 constituting the heat exchanger 40 are each disposed such that an interspace 64 is formed between the radially outer periphery of the exhaust pipe 12 and the inner surface of the outer shell member 20.

In the present embodiment, the interspace 60, the interspace 62, and the interspace 64 serve as the flow path for the exhaust gases 112. Moreover, heat exchange is performed between the exhaust gases 112 as the high-temperature fluid flowing through the interspace 60, the interspace 62, and the interspace 64 and the coolant 114 as the low-temperature fluid flowing in each of the plates 46. That is, in the present embodiment, the heat exchanging chamber 30 in which the heat exchanger 40 is disposed serves as the heat exchange portion 6.

As described above, the plates 46 constituting the outflow path heat exchanging portion 42 and the plates 46 constituting the inflow path heat exchanging portion 44 cover the entire circumference of the exhaust pipe 12.

A holding member 24 is a member that holds the heat exchanger 40 disposed in the heat exchanging chamber 30.

<The Structure of the Guide Portion>

The guide portion 8 is configured with a partition wall portion 70 and a guide member 80.

The partition wall portion 70 is one portion of the exhaust pipe 12. The partition wall portion 70 is a portion extending from the exhaust gas downstream end 18 of the exhaust pipe 12 to the downstream-side end portion 74.

The exhaust gas downstream end 18 mentioned here is an end located in the downstream side along the fluid path for the exhaust gases 112 in the exhaust pipe 12. The exhaust gas downstream end 18 is located in the downstream side of the downstream-side end portion 74 along the fluid path for the exhaust gases 112 in the exhaust gas discharging portion 2. Moreover, the downstream-side end portion 74 mentioned here is a portion of the exhaust pipe 12 that faces the last plate 46, among the plates 46 constituting the heat exchanger 40, disposed in the end portion in the downstream side along the fluid path for the exhaust gases 112 in the exhaust pipe 12.

The guide member 80 is a tubular member that has an inner diameter larger than the outer diameter of the partition wall portion 70 in the exhaust pipe 12 and is open at both ends. The guide member 80 comprises a guiding portion 82 and a covering portion 84.

The covering portion 84 is a linear and tubular portion having open ends at both sides. The covering portion 84 has an inner diameter larger than the outer diameter of the exhaust pipe 12.

The covering portion 84 is disposed concentrically with the partition wall portion 70 so as to have an interspace between the covering portion 84 and the partition wall portion 70 and to cover the outside of the partition wall portion 70.

Furthermore, at the end in the downstream side of the covering portion 84 along the flow path for exhaust gases of the exhaust pipe 12, the guiding portion 82 is connected. The guiding portion 82 is a portion formed in a diffuser-like shape having an enlarged diameter at an end in the opposite side of the downstream side of the covering portion 84. Hereinafter, the end with the enlarged diameter of the guiding portion 82 will be referred to as a guide downstream end 92.

The guide downstream end 92 is disposed the radially outside of the inner surface of the partition wall portion 70 at the exhaust gas downstream end 18 of the exhaust pipe 12.

As understood from the above description, the guide portion 8 is formed in a double-layered pipe having the partition wall portion 70 as the inner tube and the guide member 80 as the outer tube. Accordingly, the opening between the exhaust gas downstream end 18 of the exhaust pipe 12 and the guide downstream end 92 of the guide member 80 is formed along the entire circumference of the exhaust pipe 12. This opening serves as a guide inlet of the exhaust gases 112 to the guide portion 8.

<Structure of the Valve>

The valve 10 is a known valve that opens and closes the exhaust gas discharging portion 2, and is disposed along the flow path of the exhaust pipe 12 in the downstream side of the opening of the guide portion 8.

The valve 10 at least comprises a valve body 102, a valve seat 104, and a valve stem 106.

The valve body 102 is a disk-like shaped member having a diameter larger than the diameter of the exhaust pipe 12.

The valve stem 106 is a shaft that drives the valve body 102 between an opened position to open the exhaust gas discharging portion 2 and a closed position to close the exhaust gas discharging portion 2.

The valve seat 104 is a member that comes in contact with the valve body 102 to close the exhaust pipe 12. In the present embodiment, the guiding portion 82 of the guide member 80 serves as the valve seat 104. To the valve seat 104, a mesh member 108 formed in a mesh manner is attached.

The valve 10 in the present embodiment moves the valve body 102 to the opened position in the event the temperature of the coolant 114 of the internal combustion engine 110 is higher than the specified temperature that is determined in advance. As a result, in the exhaust heat recovery device 1, the valve 10 is opened to open the exhaust pipe 12. On the other hand, the valve 10 moves the valve body 102 to the closed position in the event the temperature of the coolant 114 of the internal combustion engine 110 is lower than a specified temperature. Consequently, in the exhaust heat recovery device 1, the valve 10 is closed to close the exhaust pipe 12.

<Effect of Exhaust Heat Recovery Device>

In the exhaust heat recovery device 1, when the valve 10 is closed and consequently the exhaust pipe 12 is closed, the exhaust gases 112 from the internal combustion engine 110 are guided from the guide portion 8 to the heat exchange portion 6 and heat exchange is performed with the coolant 114 in the heat exchange portion 6.

On the other hand, when the valve 10 is opened and consequently the exhaust pipe 12 is opened in the exhaust heat recovery device 1, the exhaust gases 112 from the internal combustion engine 110 flow into the exhaust pipe 14. In this way, when the valve 10 is opened, a flow of the exhaust gases 112 directly flowing from the exhaust pipe 12 to the exhaust pipe 14 is formed.

In the guide portion 8 of the exhaust heat recovery device 1, the interspace formed between the guide member 80 and the partition wall portion 70 serves as the guide path. The guide path formed by the guide portion 8 is a fluid path for the exhaust gases 112 that flow in a direction opposite to the direction of the exhaust gases 112 in the exhaust pipe 12. Accordingly, the exhaust gases 112 that flow the guide portion 8 do not reach the heat exchanger 40 unless the direction of the flow of the exhaust gases 112 is changed to a reverse direction that is the opposite direction of the flow of the exhaust gases 112 in the exhaust pipe 12.

In other words, in the exhaust heat recovery device 1, once the direct flow of the exhaust gases 112 from the exhaust pipe 12 into the exhaust pipe 14 is formed, the exhaust gases 112 cannot easily flow in a reverse direction.

Accordingly, the exhaust heat recovery device 1 can reduce the flow rate of the exhaust gases 112 that flow through the guide portion 8, and consequently the flow rate of the exhaust gases 112 that flow into the heat exchanger 40 in the event the valve 10 is opened and the exhaust pipe 12 is opened. As a result, the exhaust heat recovery device 1 can reduce the heat transferring to the low-temperature fluid when the valve 10 is open.

Moreover, in the exhaust heat recovery device 1, the guide downstream end 92 of the guide member 80 is disposed the outside of the inner surface of the partition wall portion 70 at the exhaust gas downstream end 18.

Accordingly, in the exhaust heat recovery device 1, the guide portion 8 is provided so that the exhaust gas discharging portion 2 is inhibited from being narrowed. Thus, the exhaust heat recovery device 1 can inhibit the loss of pressure around the guide portion 8 in the exhaust gas discharging portion 2 and make the flow of the exhaust gases 112 in the exhaust gas discharging portion 2 smooth when the valve 10 is open. As a result, the exhaust heat recovery device 1 can reliably reduce the flow rate of the exhaust gases 112 that flow through the guide portion 8 when the valve 10 is open, and consequently the flow rate of the exhaust gases 112 that flow into the heat exchanger 40.

In the exhaust heat recovery device 1, the heat exchange between the exhaust gases 112 and the coolant 114 is achieved with a plate 46 disposed along the entire circumference of the exhaust pipe 12.

Since the plate 46 is disposed along the entire circumference of the exhaust pipe, the exhaust heat recovery device 1 can reserve a large area of the plate 46 for the direct contact by the highly-heated exhaust gases 112 flowing from the guide portion 8 into the heat exchange portion 6. Therefore, the exhaust heat recovery device 1 can effectively recover heat from the exhaust gases 112 when the valve 10 is closed.

The guide member 80 of the present embodiment also serves as the valve seat 104 constituting the valve 10.

Accordingly, the exhaust heat recovery device 1 does not require a member that specifically serves as the valve seat 104. In other words, the exhaust heat recovery device 1 can inhibit an increase in the number of components.

Other Embodiment

Although the above has described an embodiment of the present invention, the present invention is not limited to the above-described embodiment and can be carried out in various ways without departing from the scope of the present invention.

For example, in the guide member 80 of the above-described embodiment, the guide downstream end 92 is disposed the radially outside of the inner surface of the partition wall portion 70 at the exhaust gas downstream end 18 of the exhaust pipe 12. However, the position of the guide downstream end 92 of the guide member 80 in the present disclosure is not limited to this position. In other words, the guide downstream end 92 of the guide member 80 in the present disclosure may be disposed so as to correspond to the position of the inner surface of the partition wall portion 70 at the exhaust gas downstream end 18 of the exhaust pipe 12.

Furthermore, although the guide member 80 of the above-described embodiment comprises the guiding portion 82 and the covering portion 84, the guide member of the present disclosure may comprise the covering portion 84 and the guiding portion 82 may be omitted. In this case, the end portion in the downstream side in the covering portion 84 along the fluid path for the exhaust gases 112 of the exhaust pipe 12 may be used as the guide downstream end 92 of the guide member 80. Furthermore, in the present disclosure, the mesh member 108 may be omitted.

Moreover, although the exhaust heat recovery device 1 according to the above-described embodiment is installed in a moving object having the internal combustion engine 110, the exhaust heat recovery device in the present disclosure does not have to be installed in a moving object. That is, the exhaust heat recovery device of the present disclosure may be used without being installed in a moving body if configured to perform heat exchange of the exhaust gases 112 from the internal combustion engine 110 as high-temperature fluid so as to recover heat from the exhaust gases 112. Furthermore, the low-temperature fluid of the exhaust heat recovery device according to the present disclosure does not have to be the coolant 114, but may be other fluid that serves as the low-temperature fluid.

Moreover, the heat exchanger according to the present disclosure is not limited to the heat exchanger 40 recited in the aforementioned embodiment, but may comprise one of the outflow path heat exchanging portion 42 and the inflow path heat exchanging portion 44. Furthermore, the heat exchanger according to the present disclosure may be any type of heat exchanger that performs heat exchange between the exhaust gases 112 as the high-temperature fluid and the low-temperature fluid flowing in the heat exchanger.

The mode in which one part of the structure according to the aforementioned embodiment is omitted is one embodiment of the present invention. Moreover, the mode configured by the combination of the aforementioned embodiment and the modified example is one embodiment of the present invention. Furthermore, various modes conceivable within the range without departing from the essence of the invention specified by the wording recited in claims are embodiments of the present invention.

The invention claimed is:
1. An exhaust heat recovery device comprising:
an exhaust pipe that is formed in a tubular shape and guides exhaust gases away from an internal combustion engine;
a shell member of a tubular shape that covers a radial exterior of the exhaust pipe;
a heat exchange portion disposed between the exhaust pipe and the shell member, the heat exchange portion comprising a heat exchanger that performs heat exchange between (i) the exhaust gases as a high-temperature fluid and (ii) a low-temperature fluid flowing within the heat exchanger;
a guide portion having a guide path that guides exhaust gases from the exhaust pipe to the heat exchange portion; and
a valve that is disposed in a downstream side of the guide portion along a flow path for exhaust gases in the exhaust pipe and that opens and closes the exhaust pipe,
wherein the heat exchanger includes plates with internal spaces in which the low-temperature fluid flows, the plates being disposed over the exhaust pipe along a circumferential direction of the exhaust pipe,
wherein the plates extend outward of the exhaust pipe along the circumferential direction and the plates are aligned along a direction in which the exhaust pipe extend with gaps being provided between the plates,
wherein an exhaust gas downstream end comprises a downstream end along the flow path for exhaust gases in the exhaust pipe and is disposed in a downstream side of a downstream-side end portion of the heat exchanger along the flow path for exhaust gases in the exhaust pipe, wherein the guide portion comprises:
a partition wall portion that extends from the exhaust gas downstream end in the exhaust pipe to a position of the downstream-side end portion of the heat exchanger on the exhaust pipe; and
a guide member disposed so as to at least partially cover a radial exterior of the partition wall portion to define an interspace between the partition wall portion and the guide member; and
wherein the guide member comprises a guide downstream end that comprises an end portion disposed in a downstream side of the guide member along the flow path for exhaust gases in the exhaust pipe, the guide downstream end (i) flaring outwardly in a direction toward the shell member, (ii) being radially separated from the partition wall portion, and (iii) being radially separated from an inner surface of the exhaust pipe at the exhaust gas downstream end.

2. The exhaust heat recovery device according to claim 1, wherein the guide portion comprises a double-layered pipe in which the partition wall portion serves as an inner tube and the guide member serves as an outer tube.

3. The exhaust heat recovery device according to claim 1, wherein the guide member comprises a valve seat of the valve.

4. The exhaust heat recovery device according to claim 1, wherein the interspace serves as a flow path for the low-temperature fluid.

5. The exhaust heat recovery device according to claim 1, wherein the low-temperature fluid comprises coolant of the internal combustion engine.

6. The exhaust heat recovery device according to claim 1, wherein the low-temperature fluid comprises a liquid.

7. The exhaust heat recovery device according to claim 6, wherein the liquid comprises water or oil.

8. The exhaust heat recovery device according to claim 1, wherein operation of the valve is controlled responsive to temperature of the low-temperature fluid.

9. The exhaust heat recovery device according to claim 1, wherein an entirety of the partition wall portion is arranged upstream of the guide downstream end.

10. The exhaust heat recovery device according to claim 1, wherein the guide downstream end extends in a direction non-parallel to a central axis of the partition wall portion.

11. The exhaust heat recovery device according to claim 1, wherein the guide downstream end comprises a frusto-conical shape.

12. The exhaust heat recovery device according to claim 1, wherein the valve comprises a valve body having a diameter greater than a diameter of the partition wall portion.

13. An exhaust heat recovery device comprising:
an exhaust pipe that is formed in a tubular shape and guides exhaust gases;
an outer shell member of a tubular shape that covers a radial exterior of the exhaust pipe;
a heat exchange portion disposed between the exhaust pipe and the shell member, the heat exchange portion comprising a heat exchanger that performs heat exchange between:
(i) the exhaust gases as a high-temperature fluid, and
(ii) a coolant flowing within the heat exchanger;
a guide portion guiding the exhaust gases from the exhaust pipe to the heat exchange portion;
a valve that opens and closes the exhaust pipe,
a coolant inflow pipe configured to provide coolant to the heat exchanger, and located at an upstream end of the heat exchange portion; and
a coolant outflow pipe configured to remove coolant from the heat exchanger, located at the upstream end of the heat exchange portion, and located approximately 180 degrees away from the coolant inflow pipe relative to a central axis of the exhaust pipe;
wherein the guide portion comprises a partition wall portion, and a guide member disposed radially exterior to the partition wall portion,
wherein the heat exchanger includes plates with internal spaces in which the low-temperature fluid flows, the plates being disposed over the exhaust pipe along a circumferential direction of the exhaust pipe, and
wherein the plates extend outward of the exhaust pipe along the circumferential direction and the plates are aligned along a direction in which the exhaust pipe extend with gaps being provided between the plates.

* * * * *